(12) United States Patent
Molinari

(10) Patent No.: US 8,828,292 B2
(45) Date of Patent: Sep. 9, 2014

(54) METHOD OF CREATING A DIMPLE

(75) Inventor: Arthur P. Molinari, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 245 days.

(21) Appl. No.: 13/308,489

(22) Filed: Nov. 30, 2011

(65) Prior Publication Data
US 2013/0134626 A1 May 30, 2013

(51) Int. Cl.
*B29C 45/14* (2006.01)

(52) U.S. Cl.
USPC ......... 264/163; 264/275; 264/279.1; 264/278

(58) Field of Classification Search
None
See application file for complete search history.

(56) References Cited

U.S. PATENT DOCUMENTS

| 5,122,046 | A | 6/1992 | Lavallee et al. |
| 5,155,157 | A | 10/1992 | Statz et al. |
| 5,407,341 | A | 4/1995 | Endo et al. |
| 5,494,631 | A | 2/1996 | Oka et al. |
| 5,824,258 | A | 10/1998 | Yamaguchi |
| 5,827,466 | A | 10/1998 | Yamaguchi |
| 6,168,407 | B1 | 1/2001 | Kasashima et al. |
| 6,817,852 | B2 | 11/2004 | Lavallee |
| 2006/0043632 | A1 | 3/2006 | Andersen |

FOREIGN PATENT DOCUMENTS

| JP | 09010361 | * | 1/1997 |
| JP | 2001-187172 | | 7/2001 |
| KR | 10-2002-0069598 | | 9/2002 |
| WO | 9316764 | | 9/1993 |

OTHER PUBLICATIONS

International Search Report and Written Opinion mailed Apr. 29, 2013 for PCT Application No. PCT/US2012/067294.

* cited by examiner

*Primary Examiner* — Edmund H. Lee
(74) *Attorney, Agent, or Firm* — Quinn Law Group, PLLC

(57) ABSTRACT

An apparatus and method of creating a dimple on a golf ball comprises the positioning of a runner and gate in a mold in a location where it is desired to form a dimple. A polymer is injected into a mold cavity in the mold. A cutter is placed adjacent the mold. When the cutter is actuated to cut the polymer, a pocket is formed between the cutter and the polymer in the mold, thereby creating a dimple on the molded golf ball.

8 Claims, 4 Drawing Sheets

METHOD OF CREATING A DIMPLE

FIELD

The present application relates generally to a apparatus and method of molding a dimpled surface. More specifically, the present application relates to a method of molding a cover layer of a golf ball wherein a dimple is created adjacent a gate from which material forming the cover layer is injected.

BACKGROUND

There are multiple methods for manufacturing golf balls. In many methods, a core having one or more layers is formed from a variety of conventional methods. Various cover layers are then overlaid on top of the core layers. A mantle layer or other intermediate layer may also be incorporated.

The outermost layer may be considered to require the greatest degree of detail. The outermost layer typically includes a dimple pattern to create a desired set of aerodynamic properties. Often, the configuration of the dimple pattern must be precise in order to generate the specific desired aerodynamic properties.

Molding a precise the dimple pattern may be complicated by the use of one of the standard methods of molding the cover layers. In many methods, the cover is injection molded. When the cover is injection molded, the molding process may create a tab or burr that must be abraded from the surface of the ball, adding time and cost to the process.

In addition, the injection ports from which the material or polymer forming the cover layer is injected into the mold are often located on the land or fret areas of the ball between the dimples. The surface areas of these land areas are often quite small. Because the land areas are small, the injection ports that inject the cover material into the mold may be relatively small in size. The size of the ports also may limit the speed at which the cover material can be injected and therefore the speed at which the cover can be molded. While multiple ports can be used, the increase in the number of ports may require a corresponding increase in the number of burrs to be removed, further complicating the process and increasing the time and cost.

If, instead, the injection port were to be positioned adjacent a recessed dimple area, it would be possible to increase the size of the injection port to be approximately the same diameter as a dimple. However, the use of such a position for an injection port in a conventional molding apparatus and method may create a burr within the dimple, making it complicated or impossible to remove. When such a burr is not removed, it may create an undesirable aerodynamic effect.

Therefore, there exists a need in the art for an apparatus and method for injection molding a cover onto a ball where the injection port is sufficiently large to improve molding time while not creating additional aerodynamic consequences. Also, there exists a need in the art for an apparatus and method for injection molding a cover onto a ball which minimizes the need for a burr removal step.

SUMMARY

The present embodiments relate to an apparatus and method for forming a dimple on a golf ball cover layer while overmolding a outer golf ball cover layer. The outermost layer may include a dimple pattern. A polymer appropriate for the cover layer may injected into a mold through a runner and a gate. The gate may be positioned on an inner mold surface in a position corresponding to a dimple on a finished or molded golf ball. The gate may incorporate a cutter. The cutter may cut the flow of polymer when the polymer reaches a designated temperature. The cutter may be maintained at a designated cutter temperature. When the cutter cuts the polymer, the polymer within the mold may retract from the cutter to form a pocket, thereby forming a dimple on the molded ball. In this manner and with this equipment, a cover layer may be molded on the golf ball.

In one aspect, a method of creating a dimple on a golf ball is disclosed. The method includes inserting a core into a mold. A polymer may then be injected into the mold between a mold surface and the core. The injection of the polymer may then be stopped. The injection may be stopped by cutting the polymer adjacent the mold surface. The polymer may be cut at a temperature above the glass transition temperature of the polymer and below the melt point of the polymer.

The method may further include injecting the polymer through a runner. The runner may be maintained at an elevated temperature while the mold cools. The polymer may be cut by a cutter or blade at a designated cutter temperature.

An apparatus for creating a dimple on a golf ball is also disclosed. The apparatus may include a mold having an inner surface defining a mold cavity. A runner may be in fluid communication with the mold cavity. A gate may define an opening from the runner to the mold cavity. A cutter may be positioned adjacent the gate and adjacent the inner surface of the mold. The cutter may be capable of reciprocating between a recessed position and a cutting position. The cutter may be capable of cutting a polymer injected through the runner into the mold cavity. The cutter may create a dimple on a golf ball molded with the apparatus.

The cutter may be maintained at a designated cutter temperature. The opening between the runner and the mold surface may have a shape, the shape of the opening being capable of defining the shape of the dimple. A heater may maintain the temperature of the runner while the mold cools.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The present embodiments relate to a method and apparatus for overmolding a cover onto a golf ball through an injection molding technique and thereby creating a dimple on the surface of a golf ball molded using the apparatus and method. The present embodiments permit an enlarged gate to be used, allow the gate to be positioned adjacent a desired position of a dimple on the golf ball, and permit the runner to be maintained at an elevated temperature between molding passes. The use of these embodiments may improve the molding of balls in several ways. The increased size of the gate may reduce the molding time of the ball, particularly by permitting the injected rein to be injected at a higher rate. Maintaining the runner at an elevated temperature may reduce the time between molding cycles. Positioning the gate adjacent a dimple and using a cutter may eliminate the burrs remaining on the surface of the ball, thereby minimizing or eliminating a deburring step in the process of making a ball. The disclosed embodiments may improve the molding process in at least one of these ways and thereby reduce the cost and improve the speed or efficiency of the molding process.

Figure 1:
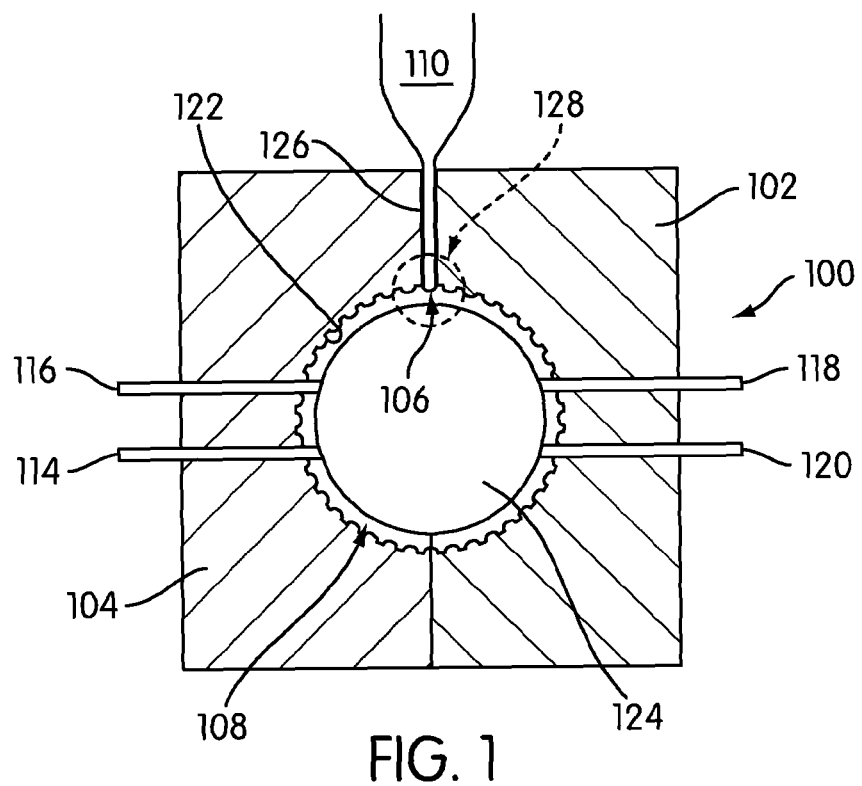
FIG. 1 is a cross-sectional view of an injection mold that may be used in connection with the present embodiments.

FIG. 1 is a simplified cross-sectional view of an apparatus 100 for injection molding a cover layer of a golf ball. The apparatus could be used to manufacture other types of balls or other types of layered articles. A person having ordinary skill in the art can make the appropriate modifications to mold other types of articles without undue experimentation.

In the mold 100 shown in FIG. 1, mold 100 includes a first mold portion 102 and a second mold portion 104. In the embodiment shown in FIG. 1, first mold portion 102 and second mold portion 104 are shown as being mold halves. In other embodiments, there could be more than two mold portions, and the mold portions used may be of different sizes. First mold portion 102 and second mold portion 104 are placed in abutting relationship and form a mold cavity 108. Mold cavity 108 has an inner surface 122.

In the embodiment shown in FIG. 1, and in many conventional molding apparati, structure is included to hold a core 124 within mold cavity 108. Core 124 may include multiple layers. In addition, the term "core" is used in the present disclosure to describe all the layers of the ball that are interior to the outer cover layer being molded in the disclosed process with the disclosed apparatus. In some embodiments, there may be one or more mantle layers, one or more cover layers, one or more core layers, and one or more intermediate layers that may be included in what is referred to as the core. A person having ordinary skill in the art is able to select the appropriate number of layers and the properties of those layers to be used to design a golf ball having the properties the designer feels are appropriate.

In the embodiment shown in FIG. 1, core 124 is positioned generally centrally in mold cavity 108 by a plurality of rods. First rod 114, second rod 116, third rod 118, and fourth rod 120 are configured to hold core 124 centrally in mold cavity 124 while an outer or cover layer is being injected into mold cavity 108 between core 124 and inner mold surface 122. The injection step typically involves the use of a reservoir 110 that contains an appropriate polymer. The polymer passes from reservoir 110 through a runner 126 and enters mold cavity 108 through gate 106. As the polymer used to form the outer layer is injected and becomes capable of supporting the weight of core 124, the rods may be retracted from the mold cavity. A person of skill in the art would also easily be able to rotate the mold so that the rods are in a vertical orientation and reservoir 110 is positioned vertically so that the mold seam is also positioned horizontally.

This apparatus and method is well-known by people of ordinary skill in the art, and has been described only in general terms. Many modifications can be made to the apparatus and method in terms of the overall injection method and mold. The present disclosure is directed to various details of the structure that injects the polymer into mold cavity 108. While FIG. 1 shows only one injection port, it will be apparent to a person having ordinary skill in the art that more than one injection port may be used. The number and location of the injection ports may vary depending on a number of factors well known to people having ordinary skill in the art.

Figure 2:
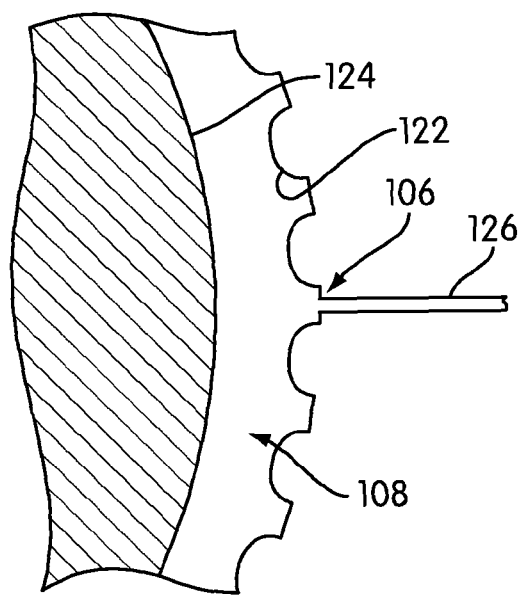
FIG. 2 is a sectional view of a portion of the mold of FIG. 1.
Figure 3:
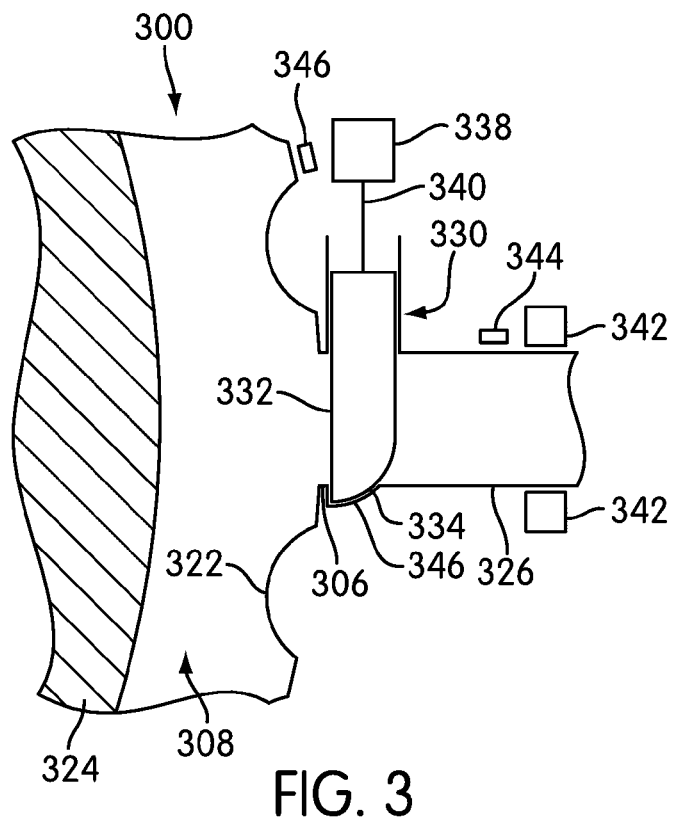
FIG. 3 is a sectional view of the portion like FIG. 2 showing a flat cutter.
Figure 4:
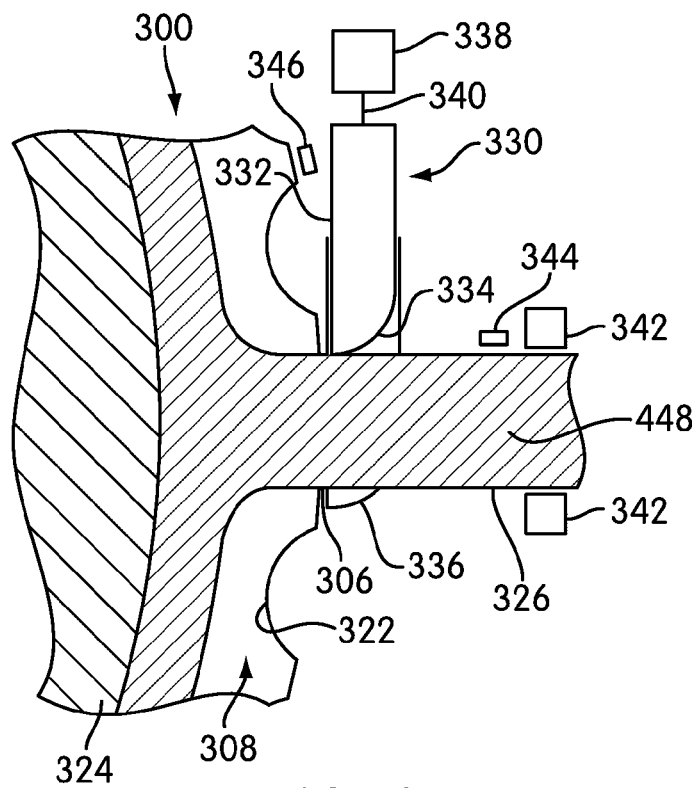
FIG. 4 is the sectional view of FIG. 3 with polymer being injected.
Figure 5:
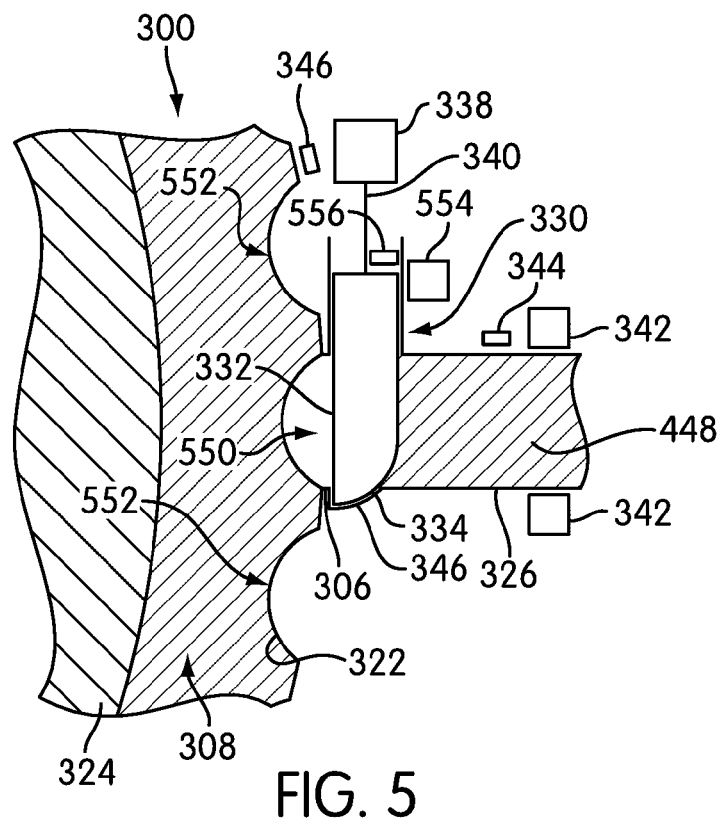
FIG. 5 is the sectional view of FIG. 4 after the actuation of the cutter.
Figure 6:
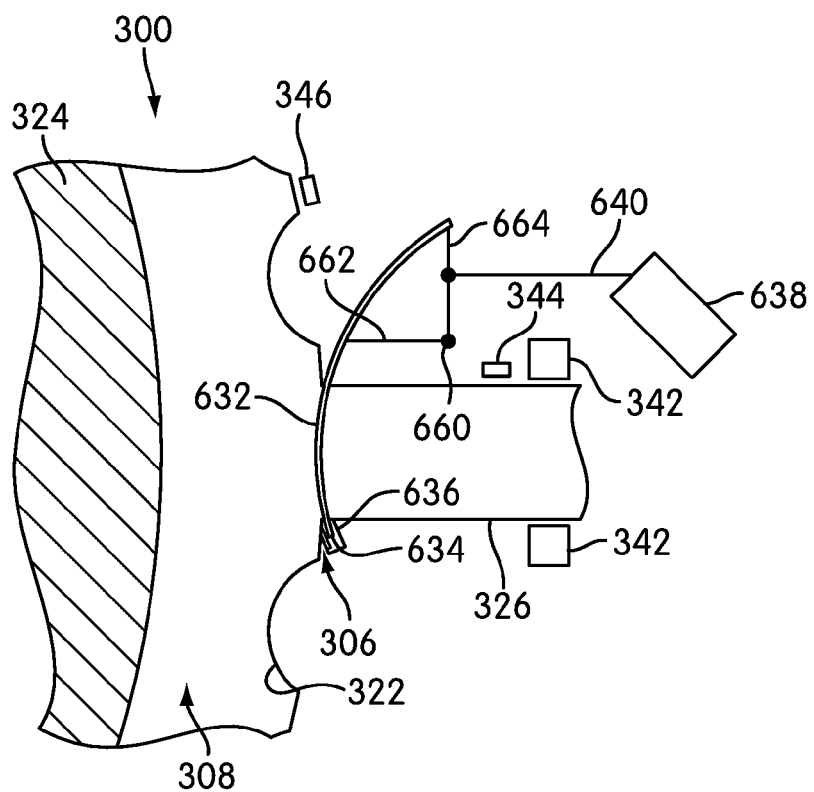
FIG. 6 is a sectional view of the portion like FIG. 2 showing a curved cutter.
Figure 7:
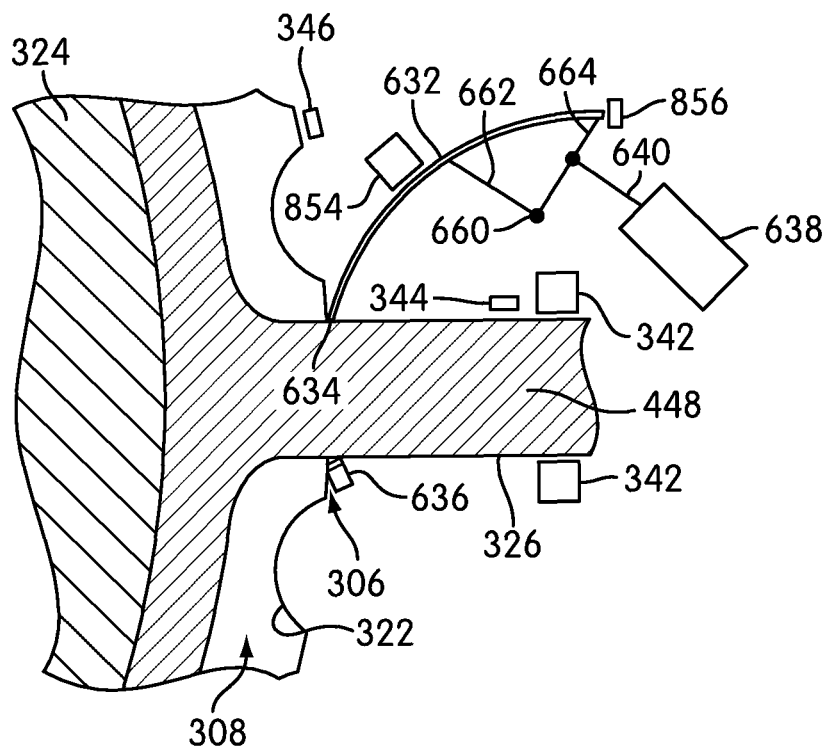
FIG. 7 is the sectional view of FIG. 6 with polymer being injected.
Figure 8:
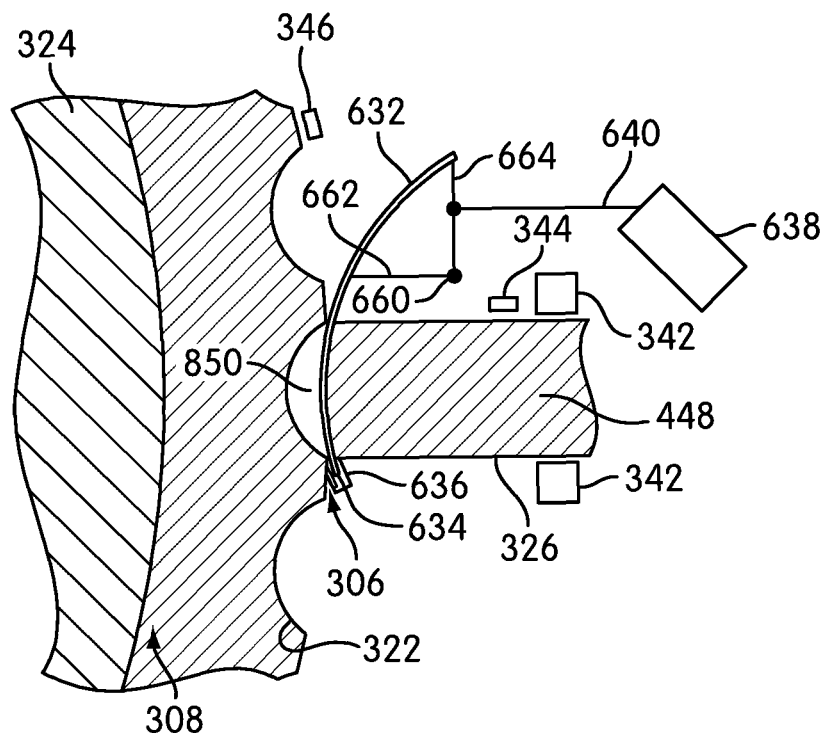
FIG. 8 is the sectional view of FIG. 7 after the actuation of the cutter.

The present disclosure relates to the dashed area numbered as 128 in FIG. 1. Each of the remaining FIGS. shows a close up of this dashed area. FIG. 2 shows a conventional configuration. FIGS. 3-5 show a first alternative embodiment and FIGS. 6-8 show a second alternative embodiment. As noted earlier, while only one gate is shown in FIG. 1 and the remaining FIGS., multiple gates may be present and distributed in varying locations around a mold 100. A person having ordinary skill in the art.

FIG. 2 shows a conventional runner 126 and gate 106. Gate 106 may be or define the opening between runner 126 and mold cavity 108 and may be positioned adjacent both runner 126 and mold cavity 108. In a conventional system, a desired polymer to be used for a cover layer may be injected from a reservoir (not shown in this FIG.) through runner 126 and gate 106 and into mold cavity 108 to partially or completely surround core 124. The polymer may be injected between inner mold surface 122 and core 124 and may completely fill any free space in mold cavity 108. When mold cavity 108 becomes full, no additional polymer is inserted into runner 126. Mold 100, including runner 126, then may be cooled and the formed ball may be ejected from the mold. When such an apparatus and method is used, a burr or tab may be created on an exterior surface of the molded ball in the position where runner 126 is located. This may be because some polymer remains in runner 126.

Runner 126 is also positioned in an area of where a fret or land may be molded between dimples. This is because when there is a burr projecting from the ball, it is desirable to remove the burr before the ball is used, because any discontinuity like a burr may affect the aerodynamics of the ball when it is played. Because the surface area for an individual fret on a ball is relatively small, the size of runner 126 may be constrained in order for it to be the same size or smaller than the size of an individual fret. Because it may be important to remove the entire burr, it is desirable to constrain the size of runner 126 to be smaller than the fret so that a conventional removal system can remove the burr from the outer surface of the molded ball. Accordingly, the rate at which the polymer can be injected into mold cavity 108 is constrained by the size of runner 126.

In addition, in a conventional system, runner 126 may also be cooled along with mold 100. Because there is no boundary between runner 126 and mold cavity 108, if runner 126 is maintained at an elevated temperature, it may negatively affect the setting of the polymer in mold 100. Accordingly, runner 126 may be cooled with mold 100. In the next mold cycle, runner 126 must then be reheated so that the polymer can flow properly through runner 126. This adds time and cost to the molding process.

FIG. 3 shows a first embodiment of a molding apparatus that may be used in connection with a molding method. FIG. 3 shows a core 324 inside a mold cavity 308. Mold cavity 308 may include mold inner surface 322. Mold 300 further may include runner 326. Runner 326 may be used to inject a polymer into mold cavity 308. Runner 326 may terminate in gate 306, which is the boundary between runner 326 and inner surface 322 of mold 300.

Mold 300 further includes cutter 330. Cutter 330 in the embodiment of FIGS. 3-5 may include a flat blade, in that outer surface 332 of cutter 330 is flat. While cutter 330 may be a blade having a tapered end 334, cutter 330 may instead have a squared end or otherwise be an alternative configuration from a blade. Cutter 330 may be positioned adjacent runner 326, gate 306, and mold inner surface 322. Runner 326 may also include recess 336. Tapered end 334 of cutter 330 and recess 336 may be configured so that tapered end 334 at least partially fits within recess 336. This interfitting may aid in the closing of runner 326 from the flow of polymer, as will be described in further detail below. Cutter 330 further includes an actuator 338. Actuator 338 may be attached to cutter 330 in any conventional manner with any desirable structure to move cutter between the cutting position shown in FIG. 3 and the recessed position shown in FIG. 4. Connector 340 between cutter 330 and actuator 338 may be a lever, a rack and pinion system, or any other structure that a person having ordinary skill in the art may deem desirable for causing the reciprocation of cutter 330 between its cutting and recessed positions.

Runner 326 may be surrounded partially or completely by heater 342. Heater 342 may be a resistance heater or any other form of heater desired to be used. In some embodiments, heater 342 may be a resistance wire wrapped around runner 326. One or more sensors 344 may be incorporated in or on runner 326 to sense the temperature of runner 326 or the polymer therein or to determine other flow characteristics of the polymer. A sensor 346 may also be incorporated in or on mold 300, desirably adjacent mold inner surface 322 to determine the temperature of the mold 300 or the polymer therein or other characteristics. A timer may also be included in one or both of the sensors or elsewhere in or associated with the mold to determine various lengths of time, such as the length of time polymer has been injected into mold cavity 308 from runner 326, the cure time of the polymer in mold cavity 308, or any other desirable passage of time.

The molding process is shown in FIGS. 4 and 5. Polymer 448 may flow or be injected through runner 326, past cutter 330, through gate 306, and into mold cavity 308. Runner 326 may be maintained at a designated runner temperature to maintain polymer 448 at or above its flow temperature and at or above its melt point. Sensor 344 on runner 326 may be configured to connect directly or indirectly with heater 342 to maintain runner 326 at a required or designated runner temperature to allow polymer 448 to flow properly. Each polymer may have a different flow temperature, and therefore, it may be desirable to be able to adjust the designated temperature of runner 326 to accommodate different desired polymer temperatures. Polymer 448 may be selected from any desired polymer or other material used to form a cover layer of a golf ball. In many embodiments, polymer 448 may include a urethane polymer or an ionomer polymer.

A first flap (not shown) may cover cutter 330 when cutter 330 is in its recessed position. A second flap (not shown) may cover optional recess 336. These flaps may prevent polymer 448 from entering either recess and may instead cause polymer 448 to continue to flow directly into mold cavity 308. The desirability of using a protective flap may depend on the materials used for polymer 448, cutter 330, the temperature, flow rate, or other characteristic.

Once polymer 448 has filled mold cavity 308 and has surrounded core 324 to the desired extent, actuator 338 may be actuated. The actuation of actuator 338 may cause cutter 330 to move from its recessed position shown in FIG. 4 to the position shown in FIG. 5. The actuation of cutter 330 may cause cutter 330 to come into contact with polymer 448 along flat side 332 of cutter 330. When flat side 332 comes into contact with polymer 448, it may cause polymer 448 to retract from cutter 330 to form a pocket 550. Pocket 550 may desirably be similar in shape and size to the dimples 552 that are adjacent pocket 550.

The formation of pocket 550 may be caused by a variety of characteristics and steps. It may be desirable in many embodiments for cutter 330 to be actuated when the portion of the polymer 448 in mold cavity 308 has cooled to be lower than the melt temperature of polymer 448 but above the glass transition temperature of polymer 448. Suitable polymers may include ionomers such as but not limited to Surlyn®, thermoplastic polyurethane, or any other known golf ball cover material capable of being injection molded. For example, Surlyn® 9650, which is available from E.I. DuPont de Nemours and Company, Inc. of Wilmington, Del., has a glass transition point of approximately 50 degrees C. and a melt temperature of about 92 degrees C. Therefore, the cutting temperature would be selected from any temperature between 50 degrees C. and 92 degrees C. Another exemplary ionomer used in golf balls has a glass transition temperature of about 42 degrees C. and a melt temperature of about 92 degrees C., so the cutting temperature of that ionomer would be selected from between about 42 degrees C. and 92 degrees C. In some embodiments, the cutting temperature selected may be proximate the glass transition temperature. Cutting temperatures between the glass transition temperature and about 5 degrees C. above the glass transition temperature may be preferred, as the material would be sufficiently cooled to allow for shape retention based on the cutter, as there would be little to no flow of the material in this temperature range. In other embodiments, the cutting temperature selected may be proximate the melt temperature if some degree of post-cutting melt is desired. In yet other embodiments, the cutting temperature may be selected to be lower than the Vicat softening temperature but higher than the glass transition temperature. For example, for Surlyn® 9650, the Vicat softening temperature is about 71 degrees C. Therefore, the cutting temperature may be selected to be between about 50 degrees C. and about 71 degrees C. In these embodiments, the cutting temperature may be selected to be proximate the glass transition temperature for the reasons stated above, proximate the Vicat softening temperature to allow for some flow of the material after cutting, or anywhere between these temperatures. Sensor 346 may be used to determine the temperature of polymer 448 and trigger actuator 330 either directly or indirectly. The actuation of the cutter at such a temperature may cause such a pocket 550 to be formed. As will be apparent to those of skill in the art, the actuator may be anything that can cause movement of the cutter, such as a screw, other twisting mechanisms, or cams.

It is noted that because pocket 550 is formed and forms a gap between polymer 448 and cutter 330, various other effects are obtained. Because the pocket 550 is formed adjacent the cutter and runner, and because pocket 550 may take the shape and size of a dimple, runner 326 may be made significantly larger than the prior art runner that had to be positioned on a fret between dimples. This change in size allows a greater flow rate of polymer 448 and reduces the time to fill mold cavity 308. In addition, because pocket 550 is formed adjacent gate 306, any burr that may be formed in that space is greatly reduced or eliminated, as no polymer remains within gate 306 or runner 326 and attached to the polymer within mold cavity 308. The elimination of the burr allows a reduction in any deburring step that follows the molding of the ball. This configuration also means that heater 342 may remain actuated between molding steps, as heated polymer is prevented from contacting the polymer in mold cavity 308 during its cure time. This separation of the polymer in the runner 326 and the mold cavity 306 reduces the preparation time between molding runs in order to heat the runner and polymer therein.

In some embodiments, the development of pocket 550 may be further enhanced by maintaining cutter 330 at a designated cutter temperature. In some embodiments, if cutter 330 is maintained at a reduced temperature, the introduction of a colder surface adjacent polymer 448 in mold cavity 308 may enhance the retraction of polymer 448 from cutter 330 and may thereby enhance the production of pocket 550. In other embodiments, a similar effect may be created if cutter 330 is maintained at an elevated temperature. A heater or chiller 554 may be included adjacent cutter 330 to adjust the temperature of cutter 330 to the designated cutter temperature. A sensor 556 may be positioned on or adjacent cutter 330 to determine whether cutter 330 is at the designated cutter temperature. Sensor 556 may directly or indirectly control chiller or heater 554 to cause cutter 330 to reach the designated temperature.

After the formation of pocket 550 in polymer 448, the formed ball may remain in mold cavity 308 until it has reached an appropriate temperature or until a desired cure time has passed. At that time, the formed ball may be ejected from mold 300 and the process restarted.

An alternative embodiment is shown in FIGS. 6-8. In the embodiment shown in FIGS. 6-8, the overall structure remains the same as the structure in FIGS. 3-5. Accordingly, the same numerals are used to represent identical structures. These structures are not redescribed in connection with the alternative embodiment.

A primary difference between the embodiment of FIGS. 3-5 and the embodiment of FIGS. 6-8 is the shape of the cutter. While cutter 330 of FIGS. 3-5 may have a blade with a flat side 332, cutter 630 of FIGS. 6-8 may instead have a curved side 632. While cutter 630 may be a blade having a tapered end 634, cutter 630 may instead have a squared end or otherwise be an alternative configuration from a blade. Cutter 630 may be positioned adjacent runner 326, gate 306, and mold inner surface 322. Runner 326 may also include recess 636. Tapered end 634 and recess 636 may be configured so that tapered end 634 at least partially fits within recess 636. This interfitting may aid in the closing of runner 326 from the flow of polymer. Cutter 630 further includes an actuator 638. Actuator 638 may be attached to cutter 630 in any conventional manner with any desirable structure to move cutter between the cutting position shown in FIG. 6 and the recessed position shown in FIG. 7. Connector 640 between cutter 630 and actuator 638 may be a lever, a rack and pinion system, or any other structure that a person having ordinary skill in the art may deem desirable for causing the reciprocation of cutter 630 between its cutting and recessed positions. Because cutter 630 is curved, the reciprocation motion between the cutting position and the recessed position may be more complicated than that produced with a flat blade. In the embodiment shown in FIGS. 6-8, cutter 630 is attached to a pivot 660 by a first pivot arm 662 and a second pivot arm 664. The movement of cutter 630 may be governed by the position of pivot 660 and the relative length and angle of first pivot arm 662 and second pivot arm 664. Because of the rotation about pivot 660, the reciprocation of cutter 630 is not linear as was true with the flat cutter of FIGS. 3-5. Accordingly, it may be desirable in some embodiments to attach connector 640 to cutter 630 or one of its attachments with a connector that has some degree of rotational freedom, as the angle at which pressure is applied to reciprocate cutter 630 may not be consistent.

The use of pivot 660 and first pivot arm 662 and second pivot arm 664 is an exemplary embodiment. In other embodiments, it may be desirable to have only a single pivot arm. In yet other embodiments, cutter 630 may ride in a track within mold 630. In yet other embodiments, actuator 638 may also be curved and may drive connector 640 or cutter 630 directly along a curved path. In yet other embodiments, the mold gate may be formed to have a 90-degree turn so that mold gate has two legs positioned orthogonal to each other. In such an embodiment, the pivot may be placed in one leg of the gate and the cutter may be placed in the leg orthogonal to the leg with the pivot. A person having ordinary skill in the art can make such modifications without undue experimentation.

The molding process is shown in FIGS. 7 and 8 and is substantially the same as that described in connection with FIGS. 4 and 5. Polymer 448 may flow or be injected through runner 326, past cutter 630, through gate 306, and into mold cavity 308. Once polymer 448 has filled mold cavity 308 and has surrounded core 324 to the desired extent, actuator 638 may be actuated. The actuation of actuator 638 may cause cutter 630 to move from its recessed position shown in FIG. 7 to the position shown in FIG. 8. The actuation of cutter 630 may cause cutter 630 to come into contact with polymer 448 along a curved side 632 of cutter 630. When curved side 632 comes into contact with polymer 448, it may cause polymer 448 to retract from cutter 630 to form a pocket 850. Pocket 850 may desirably be similar in shape and size to the dimples 552 that are adjacent pocket 850. Because cutter 630 is curved, and because the curve may be convex with respect to the polymer 448 in mold cavity 308, pocket 850 may be relatively narrow or small. In some embodiments, pocket 850 may not be created at all and instead, curved side 632 of cutter 630 may form a part of inner surface 322 of mold cavity 308. If curved side 632 is to designed to be a portion of inner surface 322 of mold cavity 322, it may be desirable to carefully shape curved side 632 so that it can be designed to easily move from a recessed position to a cutting position and return, but so that the dimple created by curved surface 632 is of a similar size and shape as the surrounding dimples 552.

In some embodiments, the development of pocket 850 may be further enhanced by maintaining cutter 630 at a designated cutter temperature. In some embodiments, if cutter 630 is maintained at a reduced temperature, the introduction of a colder surface adjacent polymer 448 in mold cavity 308 may enhance the retraction of polymer 448 from cutter 630 and may thereby enhance the production of pocket 850. In other embodiments, a similar effect may be created if cutter 630 is maintained at an elevated temperature. A heater or chiller 854 may be included adjacent cutter 630 to adjust the temperature of cutter 630 to the designated cutter temperature. A sensor 856 may be positioned on or adjacent cutter 630 to determine whether cutter 630 is at the designated cutter temperature. Sensor 856 may directly or indirectly control chiller or heater 854 to cause cutter 630 to reach the designated temperature.

After the formation of pocket 850 in polymer 448, the formed ball may remain in mold cavity 308 until it has reached an appropriate temperature or until a desired cure time has passed. At that time, the formed ball may be ejected from mold 300 and the process restarted.

The description of the molding process used in connection with the embodiment of FIGS. 6-8 omits a detailed discussion of various features described in greater detail in connection with FIGS. 3-5. Examples include the precise temperature ranges to be used, the use of flaps to cover recesses for the blade, and the like. The omission of these elements in connection with the second alternative embodiment indicates merely that these elements and discussions apply equally to the second alternative embodiment as to the first alternative embodiment. A person having ordinary skill in the art can make the desired modifications to the second alternative embodiment as easily as the first alternative embodiment.

The shape of a dimple formed by any of the variations of the processes disclosed herein may be defined by the shape of the gate. In many embodiments, it is desirable for dimples formed on the surface of the ball to be generally round. However, in some embodiments, it may be desirable to use a differently shaped dimple, such as a pentagon or other polygonal shape. The FIGS. illustrate the use of a round gate 306 corresponding to a round dimple (gap 550 or gap 850) being formed adjacent the round gate 306. If it is desired that a differently shaped dimple be created, it is desirable for the peripheral shape of gate 306 to be modified to correspond in shape and size with the shape and size of dimple desired to be created. A person having ordinary skill in the art can create a desired shape and size of gate in connection with the present embodiments.

The embodiments of the present disclosure may be easily modified to be used in conjunction with one another. Although each embodiment showed the use of only a single runner, gate and cutter structure, any number of these structures may be spaced in varying locations around a mold. In a single ball, each gate, cutter, and runner may have a different size and shape in order to form dimples of different sizes and shapes. In this way, the gates, runners, and cutters may be considered modular. A mold may be created to allow any appropriately sized injection structure in any appropriate injection location on a mold.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of creating a dimple on a golf ball, comprising:
inserting a core into a mold;
injecting a polymer into the mold between a mold surface and the core; and
stopping the injection of the polymer by cutting the polymer adjacent the mold surface at a temperature above the glass transition temperature of the polymer and below the melt point temperature of the polymer;
wherein cutting the polymer is performed using a cutter; and
wherein the cutting is performed such that the polymer retracts from the cutter to form the dimple.

2. The method of creating a dimple on a golf ball according to claim 1, wherein the cutter has a curved surface.

3. The method of creating a dimple on a golf ball according to claim 1, wherein the cutter has a flat surface.

4. The method of creating a dimple on a golf ball according to claim 1, wherein the step of cutting the polymer includes cutting the polymer with the cutter at a designated cutter temperature.

5. The method of creating a dimple on a golf ball according to claim 1, further comprising sensing a temperature of the polymer.

6. The method of creating a dimple on a golf ball according to claim 1, further comprising cooling the mold.

7. The method of creating a dimple on a golf ball according to claim 6, further comprising heating a runner through which the polymer flows to a designated runner temperature and maintaining the runner at the designated runner temperature during the step of cooling the mold.

8. The method of creating a dimple on a golf ball according to claim 1, further comprising positioning the cutter at a location on the mold surface in a position to define the dimple on the golf ball to be molded.

* * * * *